May 11, 1926.

W. G. YERGEN

TANDEM DISK HARROW

Filed Oct. 3, 1925

May 11, 1926. 1,584,266
W. G. YERGEN
TANDEM DISK HARROW
Filed Oct. 3, 1925 5 Sheets-Sheet 5

Inventor
W.G.Yergen
By Watson E. Coleman
Attorney

Patented May 11, 1926.

1,584,266

UNITED STATES PATENT OFFICE.

WILLIAM GRANT YERGEN, OF NEWBERG, OREGON.

TANDEM-DISK HARROW.

Application filed October 3, 1925. Serial No. 60,270.

This invention relates to tandem disk harrows and more particularly to harrows having a pair of forward disk gangs and a pair of tandem or rear disk gangs.

An important object of the invention is to provide means facilitating the adjustment of these gangs to place the gangs at an angle to the line of travel, employing force provided by the disks themselves.

A more specific object of the invention is to provide in a harrow of the type described means for selectively locking certain of the disks of each gang to prevent rolling thereof and then employing the difference in force between the rolling and sliding disks of each gang to shift the gangs from one position to another.

A further object of the invention is to provide means for automatically disconnecting the locked disks of the gang when the shifting has been completed to thereby permit the disks to operate in their usual manner.

A further object of the invention is to provide in a device of this character means whereby the initial locking of the disks may be accomplished at a remote point, thus enabling control thereof from a tractor or other implement employed to move the cultivator.

A further object of the invention is to provide a control element in a device of this character which will positively limit the shifting of the gangs at a predetermined point, thus insuring placement of the gangs at the proper angle without any effort on the part of the operator other than that necessary to trip the mechanism for initially locking certain of the disks to each gang.

Other objects and advantages will appear throughout the course of the following description.

My invention is illustrated in the accompanying drawings, wherein:—

Figure 9 is a similar view of the gang control disk and the mechanism associated therewith.

Figure 1:
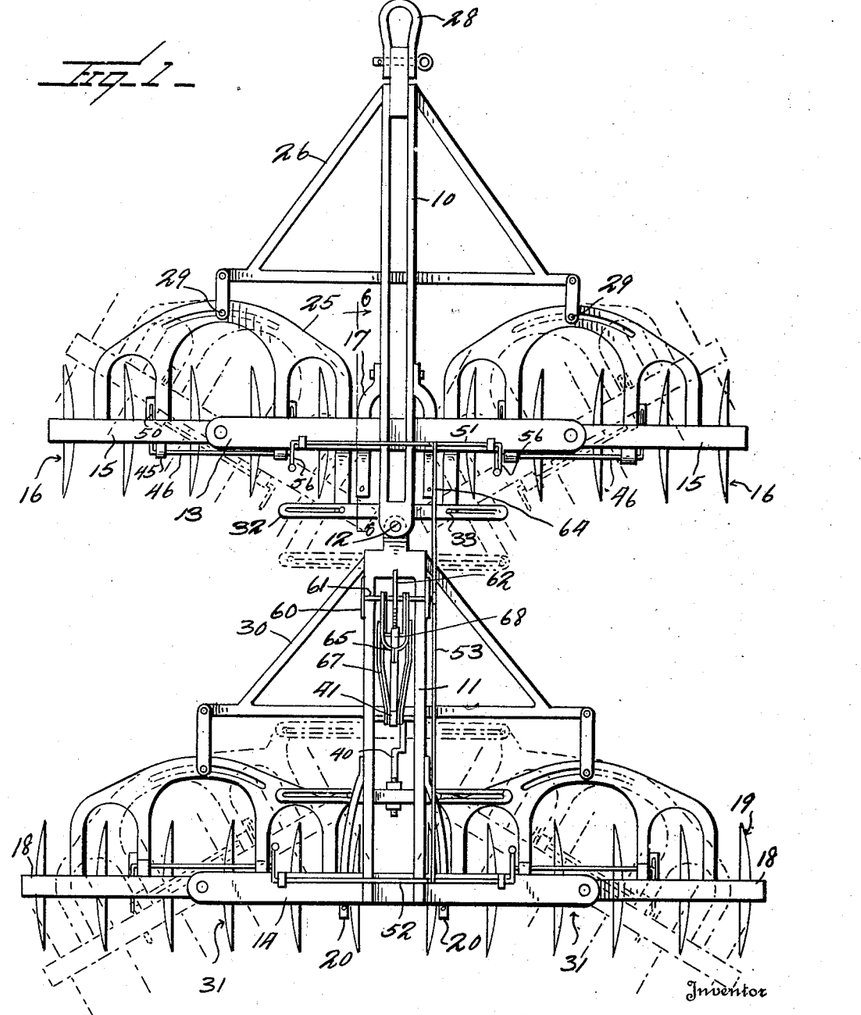
Figure 1 is a plan view of a cultivator constructed in accordance with my invention, the gangs being illustrated in solid lines in one position and in dotted lines in the second position.
Figure 2:
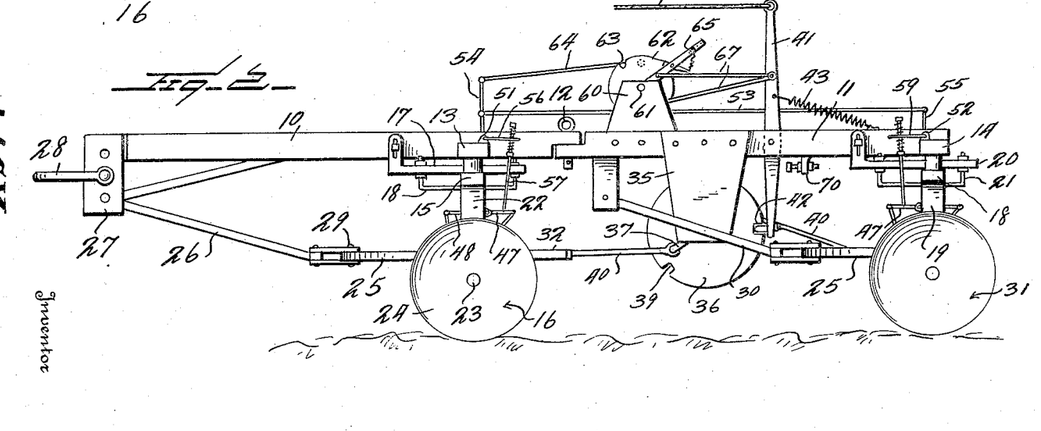
Figure 2 is a side elevation of the cultivator.
Figure 3:
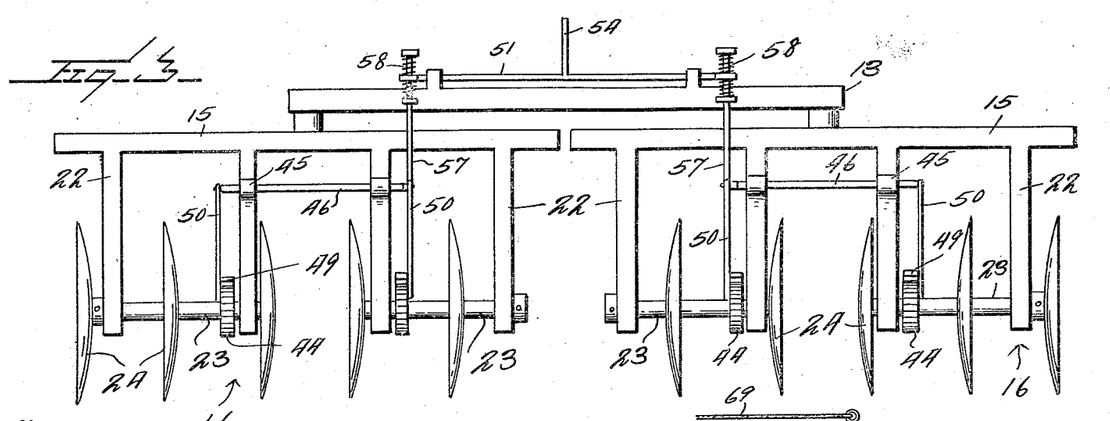
Figure 3 is a rear elevation of the front gang of the cultivator.
Figures 4, 5, 6:
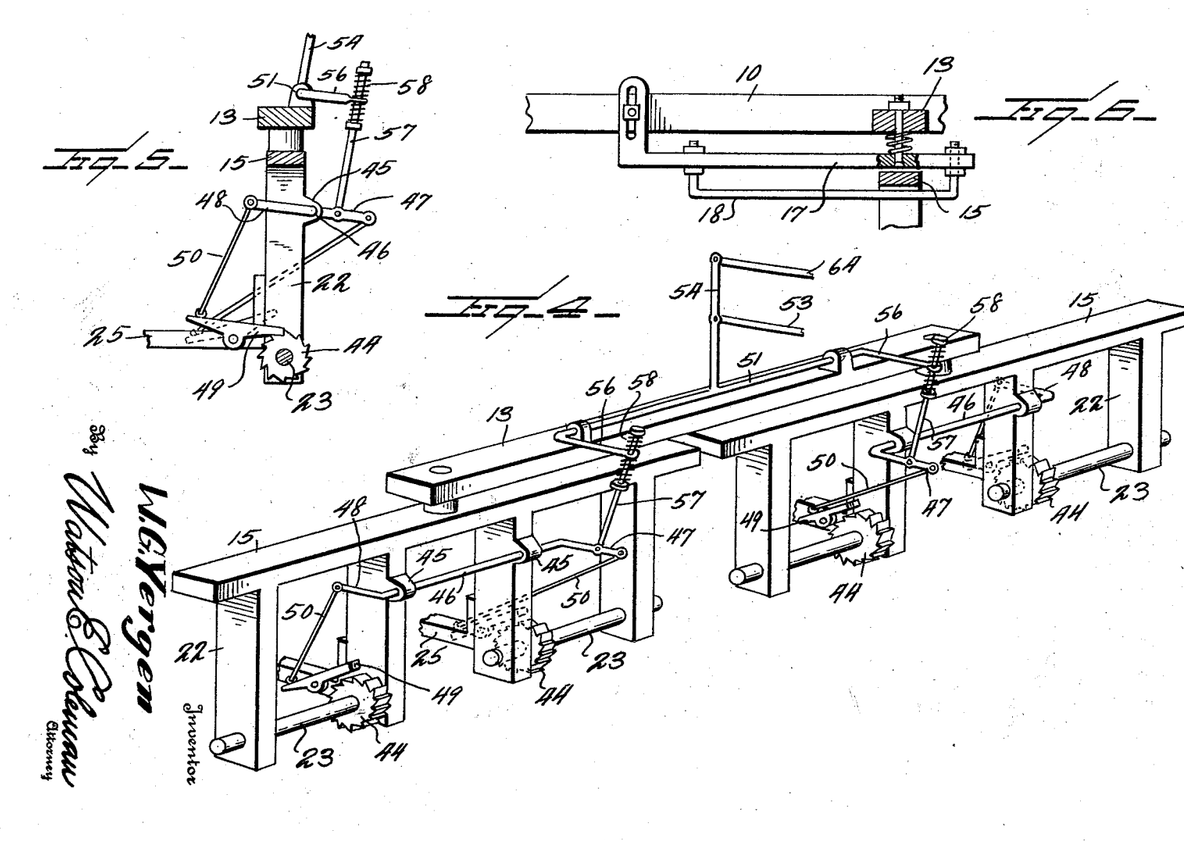
Figure 4 is a detail perspective view of the disk shafts and the associated control mechanism of the front gang of the cultivator.
Figure 5 is a detail sectional view showing the mounting and construction of the operating mechanism of the ratchets controlling the rotation of the disks.
Figure 6 is a detail sectional view upon the line 6—6 of Figure 1.
Figure 7:
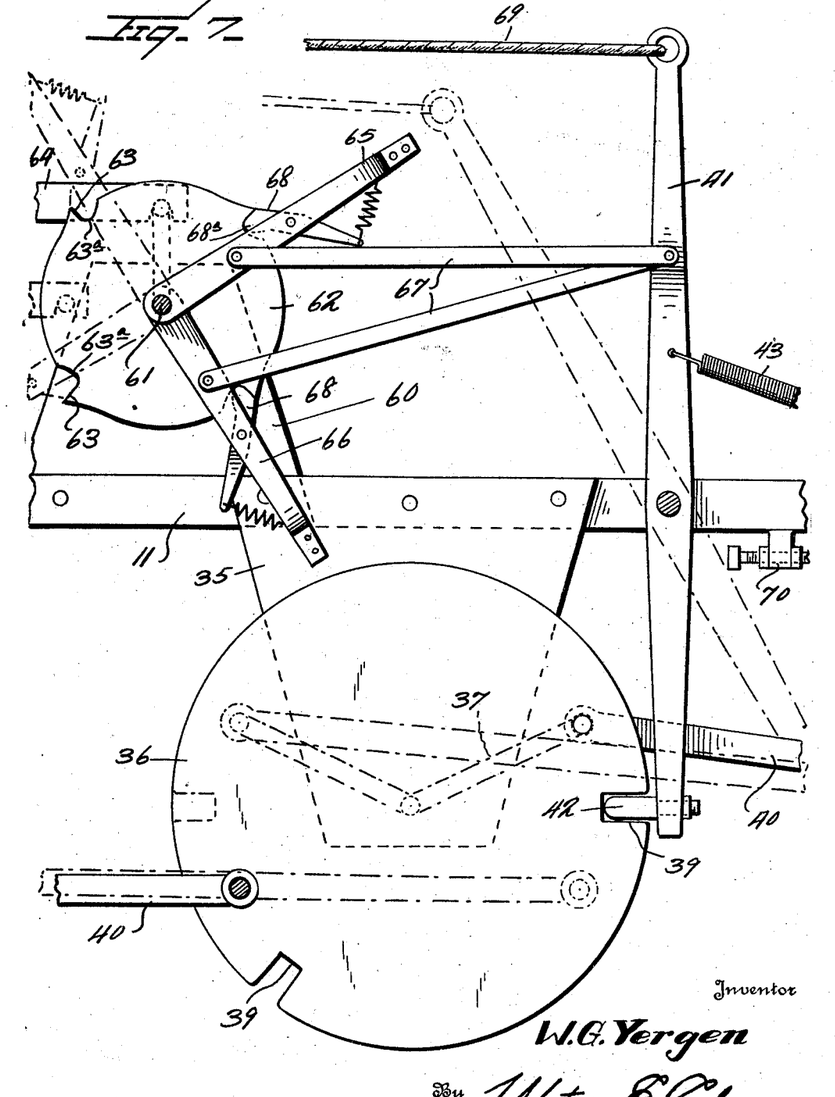
Figure 7 is an enlarged detail view showing the mounting and operation of the control disks and their immediate connections.
Figures 7, 8:
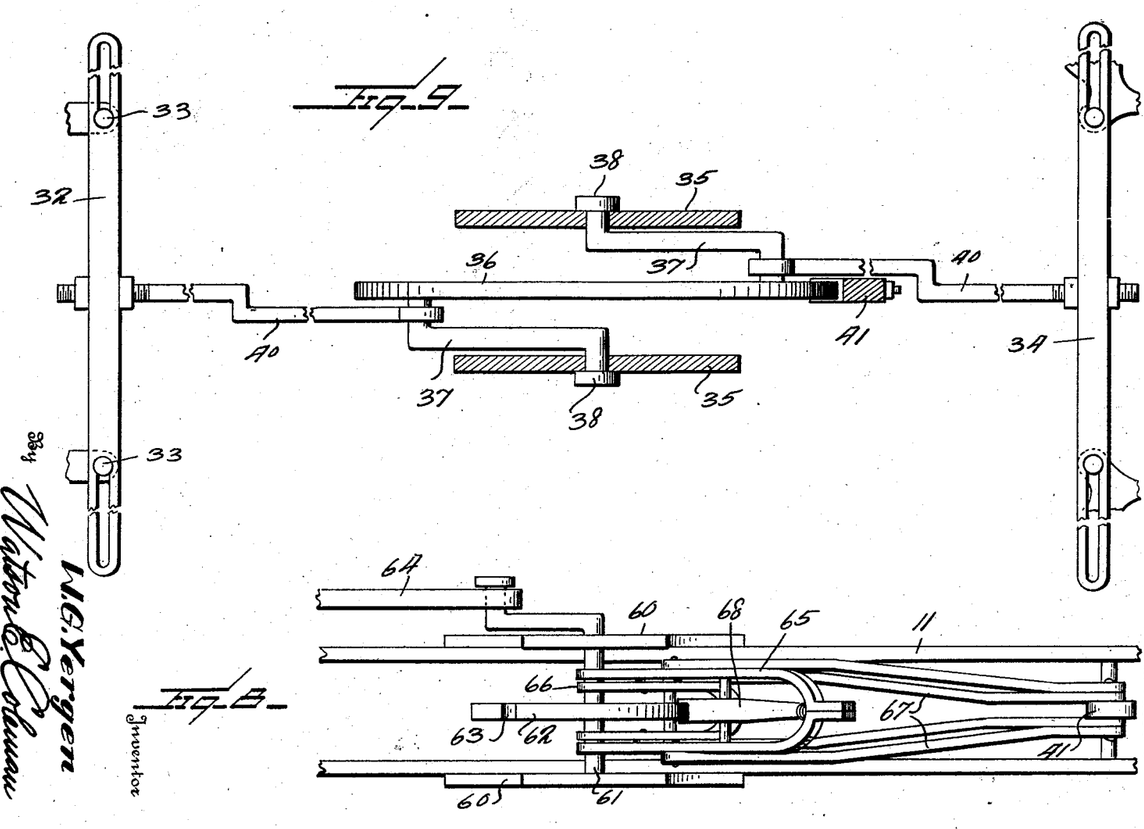
Figure 8 is a plan view of the ratchet control disk and the mechanism associated therewith.

In constructing a cultivator in accordance with my invention, I provide forward and rear tongues 10 and 11, the front end of the tongue 11 being connected with the rear end of the tongue 10 by a king bolt 12. To the forward tongue 10 adjacent its rear end, a cross bar 13 is rigidly secured and to the tongue 11 at its rear end a cross bar 14 is secured.

To each end of the cross bar 13 is pivotally secured, for horizontal swinging movement, the upper frame bar 15 of a gang frame 16. These upper frame bars have their adjacent ends operating between rails 17 secured to the main cross bar 13 and to the tongue 10 and keeper rods 18 carried by these rails so that these frame bars are held against longitudinal tilting while permitted to swing in a horizontal plane. The ends of the cross bar 14 have similarly pivoted thereto the upper frame bars 18 of gang frames 19, the inner ends of which operate between rails 20 and keeper bars 21 to prevent longitudinal tilting thereof.

Each of the frame bars 15 and 18 has depending therefrom vertical standards 22, these supports being preferably arranged in pairs, each pair providing a mounting for a shaft 23 supporting one-half of the disks 24 of the gang. Each gang is thus divided into two sections which will hereinafter be referred to as the inner sections of those lying most nearly adjacent the center of the cultivator and the outer sections or those lying at the outside of the cultivator. The vertical standards 22 of each gang frame are rigidly connected to a draft yoke 25.

Associated with the forward gangs is a triangular draft frame 26, the forward end of which is mounted upon a clevis frame 27 upon which the cultivator draft clevis 28 will be adjustably mounted. The rear corners of the triangular frame 26 are connected, as at 29, to the yokes 25 of the forward gangs in a manner permitting angular movement of these gangs to place the gangs at an angle of approximately forty-five degrees to the line of draft or at right angles to the line of draft. A similar triangular frame 30 is secured to the rear tongue 11 and is connected with the yokes 25 of the tandem gangs at 31 with connections similar to the connections employed between the frame 26 and the yokes 25.

Adjacent ends of the forward gangs are connected by a yoke 32, as at 33, with connections permitting the gangs to shift in the manner above described. This yoke projects rearwardly from the gangs while the tandem or rear gangs are similarly connected by a forwardly extending yoke 34. Secured to and depending from the tongue 11 are a pair of spaced plates 35. Between these plates is arranged a disk 36 having oppositely arranged cranks 37, the ends of which pivotally engage with the plates 35, as at 38. This disk, for a purpose presently to appear, has formed in the periphery thereof a pair of notches 39 spaced apart one-half the circumference of the disk. Adjustably secured to each gang connecting yoke 32, 34, is a connecting rod 40, the ends of which are connected to the cranks 37. These connecting rods are of such length that with the cranks 37 horizontally arranged and the crank connected to each yoke is at the side of the disk next adjacent the yoke, the gangs are in alignment and are disposed at right angles to the line of draft of the cultivator whereas when the cranks are disposed at that side of the disk 36 remote from the yokes to which they are attached, the gangs are disposed at approximately forty-five degrees to the line of draft. In order to hold the disk against rotation in either of these positions, a lever 41 is pivoted to the tongue 11 and has at its lower end a lug 42 to enter the notches 39 when they are aligned therewith. As in each position of the gangs, a notch 39 aligns with the lug, the gangs may be locked in either position. The lug is forced into the notches when the notches align therewith by a strong spring 43 connecting the lever with the tongue 11.

In order to selectively lock the sections of the gangs, the disks of each gang are rigidly secured to the shaft thereof and to each shaft 23 is rigidly secured a ratchet wheel 44, these ratchet gears being mounted at adjacent ends of the shafts 23 of each gang so that they are relatively closely arranged to one another. Adjacent vertical standards supporting the shafts 23 are provided with bearings 45 for horizontal rock shafts 46. Each rock shaft 46 has a forwardly directed arm 47 and a rearwardly directed arm 48 and these arms are connected with dogs 49 pivotally mounted upon the yoke 25 of the gang by means of links 50. The dogs 49 being mounted upon the yoke 25 are at the same side of the shafts 23 of their gang while the arms 47, 48, are arranged at opposite sides of this shaft and accordingly as the shaft 46 is rocked in one direction or the other, one dog 49 will be engaged while the other is disengaged. Thus, if the shaft is rocked in one direction, the disks of the inner gang section of the gang is locked against rotation while if it is rocked in the opposite direction, the disks of the outer gang section of the gang is locked against rotation.

As a means for simultaneously operating all of the rock shafts 46, I mount upon the cross bars 13 and 14 rock shafts 51, 52 connected to one another for simultaneous movement by a link 53 connecting arms 54, 55 of the shafts 51, 52. The shaft 51 has rearwardly directed arms 56 for connection with the arms 48 by links 57 which are yieldably variable as to length to compensate for movement of the gangs about the pivots thereof, as at 58. The shaft 52 has forwardly directed arms 59 similarly connected to the arms 47 of the shaft 46 of the tandem gangs. Extending upwardly from the tongue 11 are a pair of spaced plates 60 through which is directed a transversely extending crank shaft 61. Upon this shaft at the center thereof is secured a disk 62 having four teeth 63. This disk has secured thereto through the shaft 61 a connecting rod 64 which is connected with the upper end of the arm 54 of the shaft 51. The disk 62 has this connecting rod connected therewith in such a manner and is of such size that when the point of connection of the connecting rod with the disk is vertically aligned with the axis of the disk, the arms 56 and 59 of the shafts 51 and 52 are arranged in their neutral position and neither of the pawls of the gangs is in engagement with its ratchet wheel. When, however, its point of connection is horizontally aligned, these arms are either depressed or elevated with the result that one gang section of each gang is locked against rotation.

As a means for rotating the disk 62 in one hundred and eighty degree cycles by ninety degree steps, I provide a pair of arms 65, 66 rotatably mounted upon the shaft 61 and diverging from one another so that they are normally spaced apart approximately ninety degrees. Each arm 65, 66 is connected with the lever 41 by a link 67, the point of connection being such that each link moves its associated arm 65 or 66 through a ninety degree arc when the lever 41 is operated. These arms have each a spring-pressed dog 68 which, in the normal position of the arms, lie behind adjacent lugs 63 of the disk. The lever 41 is provided with a trip rope 69 and movement of the lever under the influence of this trip rope is limited by an adjusting stop 70.

In the operation of the device, assuming the gangs to be arranged transversely of the line of draft of the cultivator and that it is desired that these gangs be moved so that they are at forty-five degrees to the line of draft of the cultivator, the operator pulls the rope 69, shifting the lever to its fullest possible extent. The arms 65 and 66 moved forwardly under the influence of the lever and the dog 68 of the arm 65 engaging the notch of the disk rotates the disk through ninety degrees and shifts the connection of the rod 64 from a point where it is vertically aligned with the shaft 61 to a point where it is horizontally aligned with the shaft. With the construction described, this causes the disks of the inner sections of the forward gangs to be locked against movement and the outer sections of the tandem gangs to be similarly locked. Due to the difference in resistance afforded by the rolling and sliding disks of each gang, the gangs will swing about their pivots, the inner ends of the forward gangs moving rearwardly while the inner ends of the tandem or rear gangs move forwardly. The initial movement of the gangs causes rotation of the disk 36 and moves the notch 39, with which the lug 42 has been engaged, out of alignment with the lug and this lug will bear against the periphery of the disk, maintaining the lever 41 in the position to which it has been moved by the trip rope against the action of the spring 43. When the gangs have completed their movement, the lug aligns with the second notch 39 and enters the same with the result that the lever 41 returns to its normal position under the influence of the spring and in returning retracts the arms 65, 66. At this time, the arm 66 has its dog 68 engaged with a lug 63 of the disk 62 and the disk is again rotated through ninety degrees again placing the connection of the rod 64 in vertical alignment with the shaft 61 and accordingly placing the locking dogs of the gang sections in neutral position so that all of the gangs are rolling but the gangs are locked in their angular position.

Similarly, when it is desired to return the gangs to their transverse position, the trip rope is again operated and this operation causes the arm 65 to rotate the disk 62 and move the connection of the rod 64 from a point in vertical alignment with the shaft 61 to a point where it is horizontally aligned therewith. However, as the connection will, at this time, be spaced about the disk one hundred and eighty degrees from the point at which it was arranged in the operation of changing the disks from transverse to inclined positions, the opposite pawls of each gang will be brought into operation and accordingly the outer disk sections of the forward gangs will be locked and the inner disk sections of the rear or tandem gangs will be locked. The remainder of this operation will be readily understood, being identical with the return operation to unlock the disks above described.

It has been found desirable that some means be provided for locking the disk 62 to prevent its accidental rotation due to vibration and for this reason, the disk is provided adjacent each shoulder 63 with a cam notch $63^a$ receiving a lug $68^a$ on the inner face of the dog 68. This lug yieldably resists rotation of the disk but when the lever 41 is operated will readily disengage from the notch to permit operation of the disk.

It will, of course, be obvious that the mechanism herein illustrated represents but one preferred illustration of my invention and is not intended as limiting the scope of my invention, except as hereinafter claimed.

I claim:—

1. In a disk cultivator, a disk gang mounted for oscillation about a vertical pivot disposed intermediate the ends of the gang and means for locking certain of the disks of the gang against rotation to unbalance the resistance of the disks of the gang at opposite sides of the pivot and cause oscillation of the gang about its pivot.

2. In a disk cultivator, a disk gang mounted for oscillation about a vertical pivot disposed intermediate the ends of the gang, means limiting oscillation of the gang about its pivot, means for locking certain of the disks of the gang against rotation to unbalance the resistance of the disks of the gang at opposite sides of the pivot and cause oscillation of the gang about its pivot and means for locking the gang at either limit of its oscillatory movement.

3. In a disk cultivator, a disk gang mounted for oscillation about a vertical pivot disposed intermediate the ends of the gang, means limiting oscillation of the gang about its pivot, means for locking certain of the disks of the gang against rotation to unbalance the resistance of the disks of the gang at opposite sides of the pivot and cause oscillation of the gang about its pivot and means for locking the gang at either limit of its oscillatory movement, including a part releasing the locked disks of the gang when the gang is moved from one limit of its movement to the other limit and has been locked at such other limit.

4. In a cultivator, a transversely disposed gang mounted for oscillation about a vertical pivot disposed intermediate the ends of the gang, means for causing oscillation of the gang in either direction, means limiting oscillation of the gang in either direction, means for locking the gangs at either limit of their movement rendering said means for causing oscillation of the gang inoperative and a common operating means for the means locking the gang and the means causing oscillation of the gang whereby the gang is released and caused to oscillate.

5. In a disk cultivator, a disk gang mounted for oscillation about a vertical pivot disposed intermediate the ends of the gang, the disks of the gang being divided into sections arranged at opposite ends of the gang, means for locking the disks of either section of the gang against rotation whereby the increased resistance of the locked disks causes oscillation of the gang about its pivot.

6. In a disk cultivator, a disk gang mounted for oscillation about a vertical pivot disposed intermediate the ends of the gang, the disks of the gang being divided into sections arranged at opposite ends of the gang, means for locking the disks of either section of the gang against rotation whereby the increased resistance of the locked disks causes oscillation of the gang about its pivot, means limiting the oscillation of the gang in either direction and means for locking the gang at either limit of its oscillatory movement released by operation of the first named means.

7. In disk cultivator, a disk gang mounted for oscillation about a vertical pivot disposed intermediate the ends of the gang, the disks of the gang being divided into sections arranged at opposite ends of the gang, means for locking the disks of either section of the gang against rotation whereby the increased resistance of the locked disks causes oscillation of the gang about its pivot, means limiting the oscillation of the gang in either direction and means for locking the gang at either limit of its oscillatory movement released by operation of the first named means, and automatically relocking the gang when the gang is shifted to its new position under the influence of the increased resistance.

8. In a disk cultivator, a disk gang mounted for oscillation about a vertical pivot disposed intermediate the ends of the gang, the disks of the gang being divided into sections arranged at opposite sides of the gang, means for locking the disks of either section of the gang against rotation whereby the increased resistance of the locked disks causes oscillation of the gang about its pivot, means limiting the oscillation of the gang in either direction and means for locking the gang at either limit of its oscillatory movement released by operation of the first named means, and automatically relocking the gang when the gang has shifted to its new position under the influence of the increased resistance and by such relocking releasing the locked disks of the gang.

9. In a disk cultivator, a disk gang mounted for oscillation about a vertical pivot disposed intermediate the ends of the gang, means for increasing the resistance of the disks at either end of the gang to thereby unbalance the gang and cause oscillation of the gang about its pivot, a rotatable locking disk, a connecting rod for the locking disk and one end of the gang whereby the disk is rotated as the gang shifts about its pivot, a lever having a lug and spaced notches in the locking disk in which said lug may engage to limit rotation of the locking disk to thereby limit rotation of the gang.

10. In a disk cultivator, a disk gang mounted for oscillation about a vertical pivot disposed intermediate the ends of the gang, means for increasing the resistance of the disks at either end of the gang to thereby unbalance the gang and cause oscillation of the gang about its pivot, a rotatable locking disk, a connecting rod for the locking disk and one end of the gang whereby the disk is rotated as the gang shifts about its pivot, a lever having a lug, spaced notches in the locking disk in which said lug may engage to limit rotation of the locking disk to thereby limit rotation of the gang and a spring urging the lever in a direction to engage the lug in an aligned notch of the disk.

11. In a disk cultivator, a disk gang mounted for oscillation about a vertical pivot disposed intermediate the ends of the gang, means for locking certain of the disks of the gang against rotation to unbalance the resistance of the disks of the gang at opposite sides of the pivot and cause oscillation of the gang about its pivot, a rotatable locking disk, a connecting rod for the locking disk and one end of the gang whereby the disk is rotated as the gang shifts about its pivot, a lever having a lug and spaced notches in the locking disk in which said lug may engage to limit rotation of the locking disk to thereby limit rotation of the gang.

12. In a disk cultivator, a disk gang mounted for oscillation about a vertical pivot disposed intermediate the ends of the gang, means for locking certain of the disks of the gang against rotation to unbalance the resistance of the disks of the gang at opposite sides of the pivot and cause oscillation of the gang about its pivot, a rotatable locking disk, a connecting rod for the locking disk and one end of the gang whereby the disk is rotated as the gang shifts about its pivot, a lever having a lug and spaced notches in the locking disk in which said lug may engage to limit rotation of the locking disk to thereby limit rotation of the gang and a spring urging the lever in a direction to engage the lug in an aligned notch of the disk.

13. In a disk cultivator, a disk gang mounted for oscillation about a vertical pivot disposed intermediate the ends of the gang, means for locking certain of the disks of the gang against rotation to unbalance the resistance of the disks of the gang at opposite sides of the pivot and cause oscillation of the gang about its pivot, a rotatable locking disk, a connecting rod for the locking disk and one end of the gang whereby the disk is rotated as the gang shifts about its pivot, a lever having a lug and spaced notches in the locking disk in which said lug may engage to limit rotation of the locking disk to thereby limit rotation of the gang and a spring urging the lever in a direction to engage the lug in an aligned notch of the disk and a connection between said lever and said locking means releasing the locking means upon engagement of the lug in the notch of the disk.

14. In a disk cultivator, a disk gang mounted for oscillation about a vertical pivot disposed intermediate the ends of the gang, the disks of the gang being divided into sections arranged at opposite ends of the gang, means for locking the disks of either section of the gang against rotation whereby the increased resistance of the locked disks causes oscillation of the gang about its pivot and by consecutive operations thereof alternately locking the disks of the sections.

15. In a disk cultivator, a disk gang mounted for oscillation about a vertical pivot disposed intermediate the ends of the gang, the disks of each gang being divided into sections arranged at opposite ends of the gang, a shaft for each section upon which the disks of the section are rigidly secured, a ratchet wheel upon each shaft and a pawl for each ratchet wheel.

16. In a disk cultivator, a disk gang mounted for oscillation about a vertical pivot disposed intermediate the ends of the gang, the disks of each gang being divided into sections arranged at opposite ends of the gang, a shaft for each section upon which the disks of the section are rigidly secured, a ratchet wheel upon each shaft, a pawl for each ratchet wheel and means for alternately operating said pawls to cause engagement of the same with the disks thereof.

17. In a disk cultivator, a disk gang mounted for oscillation about a vertical pivot disposed intermediate the ends of the gang, the disks of each gang being divided into sections arranged at opposite ends of the gang, a shaft for each section upon which the disks of the section are rigidly secured, a ratchet wheel upon each shaft, a pawl for each ratchet wheel and means for operating said pawls engaging the pawl of one ratchet wheel therewith, then moving the pawls of both ratchet wheels to inoperative position and then engaging the pawl of the other of the ratchet wheels with its ratchet wheel.

18. In a disk cultivator, a disk gang mounted for oscillation about a vertical pivot disposed intermediate the ends of the gang, the disks of each gang being divided into sections arranged at opposite ends of the gang, a shaft for each section upon which the disks of the section are rigidly secured, a ratchet wheel upon each shaft, a pawl for each ratchet wheel, said pawls being pivotally supported from the frame of the gangs at corresponding sides of their associated ratchet wheels, a rock shaft supported above the disk shafts of the gang and normally disposed in one position, said rock shaft having oppositely extending arms, connections between said arms and said pawl and means for operating the rock shaft.

19. In a disk cultivator, a disk gang mounted for oscillation about a vertical pivot disposed intermediate the ends of the gang, the disks of each gang being divided into sections arranged at opposite ends of the gang, a shaft for each section upon which the disks of the section are rigidly secured, a ratchet wheel upon each shaft, a pawl for each ratchet wheel and means for operating said pawls engaging the pawl of one ratchet wheel therewith, then moving the pawls of both ratchet wheels to inoperative position and then engaging the pawl of the other of the ratchet wheels with its ratchet wheel, a crank, connections between said crank and said pawls whereby the pawls are disposed in neutral position when the crank is at either of two positions but spaced apart one hundred and eighty degrees in the travel of the crank and one pawl is engaged and the other pawl disengaged when the crank is at a point ninety degrees spaced from the first named points in its travel and means for rotating said crank by ninety degree steps.

20. In a disk cultivator, a disk gang mounted for oscillation about a vertical pivot disposed intermediate the ends of the gang, the disks of each gang being divided into sections arranged at opposite ends of the gang, a shaft for each section upon which the disks of the section are rigidly secured, a ratchet wheel upon each shaft, a pawl for each ratchet wheel, means for operating said pawls engaging the pawl of one ratchet wheel therewith, then moving the pawls of both ratchet wheels to inoperative position and then engaging the pawl of the other of the ratchet wheels with its ratchet wheel, a crank connection between said crank and said pawls whereby the pawls are disposed in neutral position when the crank is at either of two positions but spaced apart one hundred and eighty degrees in the travel of the crank and one pawl is engaged and the other pawl disengaged when the crank is at a point ninety degrees spaced from the first named points in its travel, means for rotating said crank by ninety degree steps comprising a member manually movable in one direction, a spring for retracting the member and a connection between the member and the crank whereby an operation of the member in either direction advances the crank ninety degrees.

21. In a disk cultivator, a disk gang mounted for oscillation about a vertical pivot disposed intermediate the ends of the gang, the disks of each gang being divided into sections arranged at opposite ends of the gang, a shaft for each section upon which the disks of the section are rigidly secured, a ratchet wheel upon each shaft, a pawl for each ratchet wheel, means for operating said pawls engaging the pawl of one ratchet wheel therewith, then moving the pawls of both ratchet wheels to inoperative position and then engaging the pawl of the other of the ratchet wheels with its ratchet wheel, a crank, connections between said crank and said pawls whereby the pawls are disposed in neutral position when the crank is at either of two positions but spaced apart one hundred and eighty degrees in the travel of the crank and one pawl is engaged and the other pawl disengaged when the crank is at a point ninety degrees spaced from the first named points in its travel, means for rotating said crank by ninety degree steps comprising a member manually movable in one direction, a spring for retracting the member, a connection between the member and the crank whereby an operation of the member in either direction advances the crank ninety degrees, comprising a disk rotatable concentrically with the crank and fixed against rotation with relation thereto, said disk having ratchet lugs, a pair of arms pivoted co-axial with the disk and movable in opposite directions about the axis, a pawl on each arm to engage the ratchet lugs of the disk and a connection between the pawl and the movable member whereby the movable member shifts each of the arms through ninety degrees at each operation thereof in either direction.

22. In a cultivator, forward and tandem pairs of disk gangs, each gang being mounted for oscillation about a vertical pivot disposed intermediate the ends of the gang and means for simultaneously locking certain of the disks of the gang to thereby unbalance the resistance of the disks of each gang at opposite sides of the pivot thereof and cause oscillation of the gang about its pivot and means for automatically locking the gangs at either limit of their oscillatory movement.

23. In a disk cultivator, a plurality of gangs each oscillatable about a vertical pivot from a position where they are disposed substantially transversely to the line of travel of the cultivator to a position where they are disposed at substantially forty-five degrees to the line of travel of the cultivator and means under manual control for simultaneously locking certain of the disks of each gang against rotation to unbalance the resistance of the disks of the gangs at opposite sides of the pivot and cause oscillation of the gangs about their pivots in one or the other of said positions and then to lock the gangs in their new position.

In testimony whereof I hereunto affix my signature.

WILLIAM GRANT YERGEN.